United States Patent

Someno et al.

[11] Patent Number: 6,034,820
[45] Date of Patent: Mar. 7, 2000

[54] DIELECTRIC OPTICAL FILTER WITH ABSORPTIVE METAL LAYER

[75] Inventors: Yoshihiro Someno, Miyagi-ken; Koichi Kamiyama, Fukushima-ken, both of Japan

[73] Assignee: Alps Electric Co., Ltd., Japan

[21] Appl. No.: 09/041,240

[22] Filed: Mar. 12, 1998

[30] Foreign Application Priority Data

Mar. 27, 1997 [JP] Japan ................................. 9-075757

[51] Int. Cl.[7] .......................................... G02B 5/30
[52] U.S. Cl. ............................ 359/585; 359/589
[58] Field of Search ........................ 359/360, 585, 359/589

[56] References Cited

U.S. PATENT DOCUMENTS

| | | | |
|---|---|---|---|
| 3,649,359 | 3/1972 | Apfel et al. | 359/587 |
| 3,679,291 | 7/1972 | Apfel et al. | 359/587 |
| 4,009,453 | 2/1977 | Mahlein | 359/585 |
| 5,140,457 | 8/1992 | Letter | 359/585 |
| 5,337,191 | 8/1994 | Austin | 359/885 |
| 5,583,704 | 12/1996 | Fujii | 359/585 |

FOREIGN PATENT DOCUMENTS

| | | | |
|---|---|---|---|
| 0971398 | 1/1959 | Germany | 359/585 |
| 25 28 814 A1 | 1/1976 | Germany . | |
| 1-114802 | 5/1989 | Japan . | |
| 0292125 | 10/1953 | Sweden | 359/585 |
| WO 85/03164 | 7/1985 | WIPO | 359/360 |

*Primary Examiner*—Cassandra Spyrou
*Assistant Examiner*—John Juba, Jr.
*Attorney, Agent, or Firm*—Brinks Hofer Gilson & Lione

[57] ABSTRACT

An optical filter, for absorbing a part of the optical signals with a central wavelength $\lambda$ and restricting the intensity of the transmitted light, includes a dielectric block with a high refractive index, a metal film, and a dielectric block with a low refractive index deposited on a substrate in that order in the direction of the incident light.

5 Claims, 6 Drawing Sheets

6,034,820

1

DIELECTRIC OPTICAL FILTER WITH ABSORPTIVE METAL LAYER

BACKGROUND OF THE INVENTION

1. Field of the Invention

The present invention relates to an optical filter which absorbs a part of the optical signals passing through an optical path and restricts the intensity of transmitted light.

2. Description of the Related Art

Generally, the optimization of the configuration of a multilayer film constituting an optical filter can restrict the intensity of transmitted light by absorbing a part of the optical signals and thus an optical filter having a predetermined transmittance is obtainable. FIG. 6A shows the configuration of a conventional multilayered optical filter, and FIG. 6B shows the thickness and the refractive index of each layer in the configuration shown in FIG. 6A. The optical filter includes $TiO_2$ layers having a relatively high refractive index ($n \approx 2.5$) and $SiO_2$ layers having a relatively low refractive index ($n \approx 1.45$), in a thickness of $\lambda/5$ to $\lambda/10$, alternately deposited several times between substrates 1a and 1b, and also includes a metal film 2 (aluminum) having a lower refractive index ($n \approx 0.95$) and a thickness of several to several tens of nanometers deposited between two adjacent $SiO_2$ layers, for the purpose of achieving a transmittance of 30% to 40% for a central wavelength $\lambda=780$ nm passing through a typical optical path.

FIG. 7 shows the reflectance R of the optical filter shown in FIG. 6 at a wavelength $\lambda$ and FIG. 8 shows the transmittance T of the same. As shown in FIG. 7, although the reflectance R reaches a minimum of approximately 15% when the wavelength $\lambda$ is nearly equal to 730 nm, it increases at a given wavelength $\lambda=780$ nm. Also, as shown in FIG. 8, although the transmittance T reaches a maximum of approximately 35% when the wavelength $\lambda$ is nearly equal to 720 nm, it decreases slightly at a given wavelength $\lambda=780$ nm.

In such an optical filter, when the reflectance increases, the reflected light adversely affects signal light. As mentioned above, the conventional optical filter has a minimum reflectance R of approximately 15% and cannot achieve a lower reflectance, for example, 3% or less. Also, as mentioned above, the conventional optical filter requires depositing, several tens of times, dielectric thin films having a high refractive index and dielectric thin films having a low refractive index, and therefore the fabricating process becomes complicated, resulting in a high fabrication cost.

SUMMARY OF THE INVENTION

It is an object of the present invention to provide an optical filter which achieves a predetermined transmittance and a low reflectance. It is another object of the present invention to provide an optical filter which has a considerably fewer number of layers in the configuration thereof.

In the present invention, a metal film having a refractive index of 1 or more at a central wavelength is used. The metal film is sandwiched between one pair of dielectric blocks having different equivalent refractive indices, and the dielectric block with a high refractive index, the metal film, and the dielectric block with a low refractive index are deposited on a substrate in that order in the direction of the incident light. In such a layered configuration, a predetermined transmittance and a low reflectance are obtainable and the fabrication process can be simplified by reducing the number of layers.

2

DESCRIPTION OF THE PREFERRED EMBODIMENT

In an optical filter in accordance with the present invention, a dielectric block with a high refractive index, a metal film, and a dielectric block with a low refractive index are deposited on a substrate in that order in the direction of the incident light. As the metal film, a material having a refractive index of 1 or more at a central wavelength is used. An optical filter having such a configuration enables a predetermined transmittance at a wavelength $\lambda$, for example, 780 nm, and at the same time enables a low reflectance, for example, 1% or less, which has not been achieved by any conventional configuration. Also, the number of dielectric thin films, which has been several tens, can be significantly reduced.

Any material having a refractive index of 1 or more at a central wavelength of incident light is suitable for the metal film. For example, at a central wavelength of 400 nm to 800 nm, good results are obtained at any wavelength when Ni, Pt, and Ti are selected, and good results are obtained at limited wavelengths when Cu, Au, and Al are selected.

Any layered configuration may be applicable to one pair of dielectric blocks as long as each has a different equivalent refractive index. If a single-layer dielectric thin film, for example, $TiO_2$ or the like, is selected for the high refractive index dielectric block and a single-layer dielectric thin film, for example, $SiO_2$ or the like, is selected for the low refractive index dielectric block, the three-layer configuration, composed of the high refractive index dielectric block, the metal film, and the low refractive index dielectric block, is obtained, which considerably simplifies the fabrication process.

Also, a protective layer may be provided as required on the surface of the dielectric block, opposite to the substrate, and an adjusting layer may be provided on the dielectric block in order to adjust the equivalent refractive index.

Figure 1:
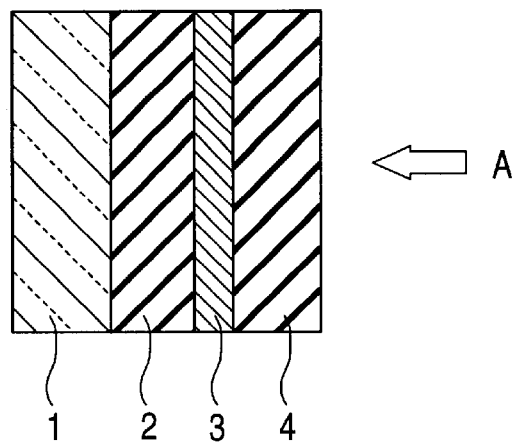
FIG. 1 is a schematic representation of an optical filter as an embodiment of the present invention.

As shown in FIG. 1, an optical filter, as an embodiment of this invention, has a three-layered configuration including a low refractive index film 2, a metal film 3, and a high refractive index film 4 sequentially deposited on a substrate 1, wherein light enters in the direction as shown by the arrow A. Specifically, with reference to the refractive index at a wavelength of 780 nm, the substrate 1 is composed of glass having a refractive index n≈1.9, on which a $SiO_2$ layer (n≈1.45) as the low refractive index film 2, a Ni layer (n≈2.4) as the metal film 3, and a $TiO_2$ layer (n≈2.5) as the high refractive index film 4 are deposited in that order by a sputtering process or the like. The thickness of each layer is as follows:

| | |
|---|---|
| $SiO_2$ layer: | t ≈ 60 nm |
| Ni layer: | t ≈ 10 nm |
| $TiO_2$ layer: | t ≈ 70 nm |

Figure 2:
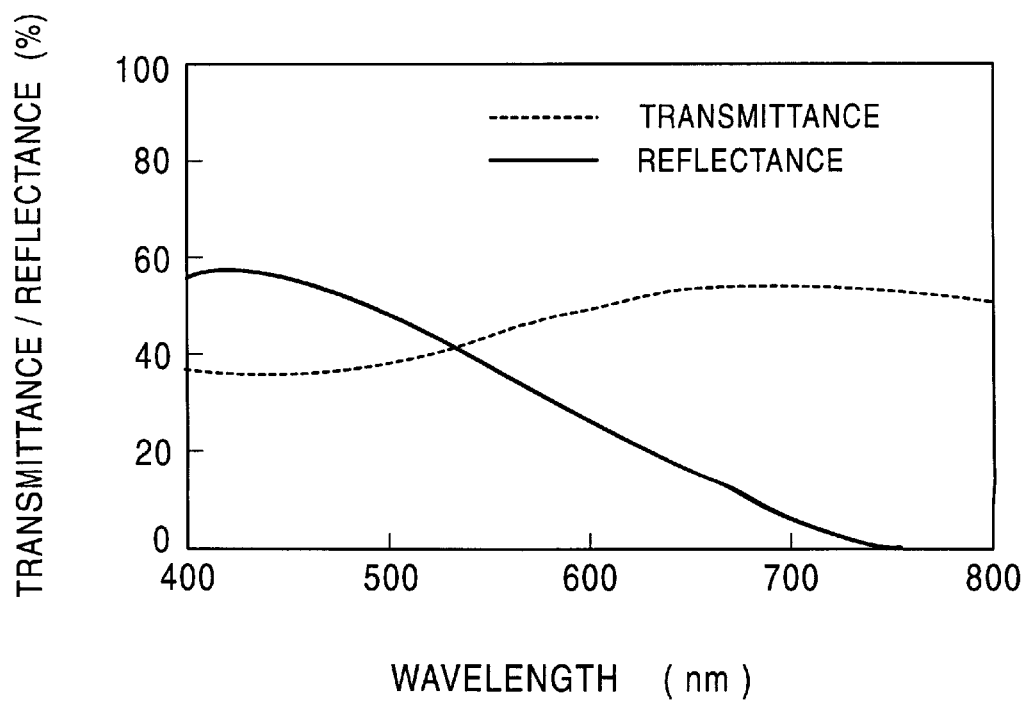
FIG. 2 is a graph which shows the relationships between the central wavelength and the reflectance and between the central wavelength and the transmittance of the optical filter shown in FIG 1.

In the optical filter having the configuration described above, the transmittance and the reflectance were observed while changing the central wavelength λ of the incident light. As shown in FIG. 2, the reflectance reaches 1% or less at a central wavelength λ of approximately 720 nm and the reflectance reaches 0.1% or less at a central wavelength λ of 780 nm, indicating substantially no reflection. Meanwhile, the transmittance reaches approximately 50% at a central wavelength λ between 700 and 800 nm, and thus an optical filter having a very low reflectance can be achieved.

TABLE 1 shows the experimental results obtained when Al, Cu, Ni, Ag, Au, Pt and Ti were selected as a material for the metal film 3 while changing the central wavelength λ.

TABLE 1

| Wavelength (nm) | 400 | 500 | 600 | 700 | 800 |
|---|---|---|---|---|---|
| Ni | Good | Good | Good | Good | Good |
| Pt | Good | Good | Good | Good | Good |
| Ti | Good | Good | Good | Good | Good |
| Cu | Good | Good | Failure | Failure | Failure |
| Au | Good | Failure | Failure | Failure | Failure |
| Al | Failure | Failure | Good | Good | Good |
| Ag | Failure | Failure | Failure | Failure | Failure |

"Good" means a result which satisfies the optical properties of the optical filter, that is, a reflectance of 0.1% or less and a transmittance in the range of 10% to 90% can be achieved. "Failure" means a result which does not satisfy either the reflectance requirement or the transmittance requirement, or a result which does not satisfy both requirements. As shown in TABLE 1, Ni, Pt and Ti had good results at all the predetermined central wavelengths λ from 400 to 800 nm, and Cu, Au and Al had good results at limited wavelengths.

Figure 3:
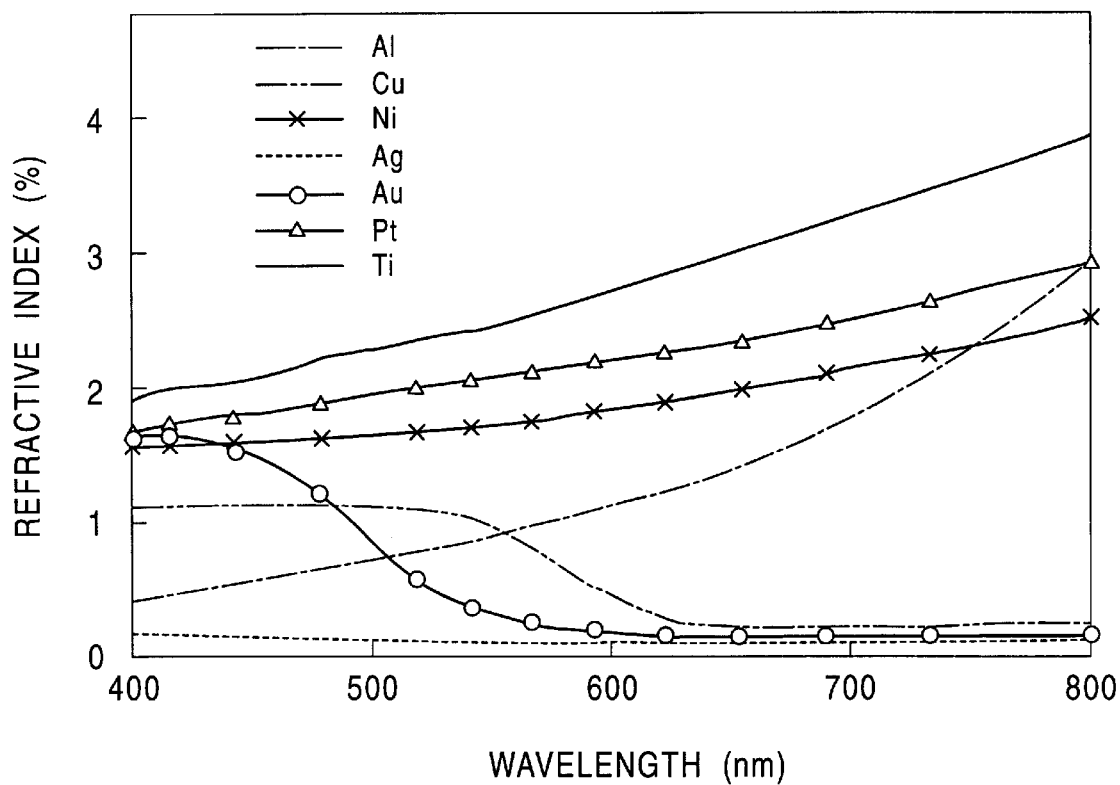
FIG. 3 is a graph which shows the relationship between the refractive index and the wavelength of metal films.

Next, the above metals were compared in terms of the refractive index at each wavelength. As shown in FIG. 3, it was found that all metals have a refractive index of 1 or more at the wavelengths where a good result was obtained in TABLE 1.

Figure 4:
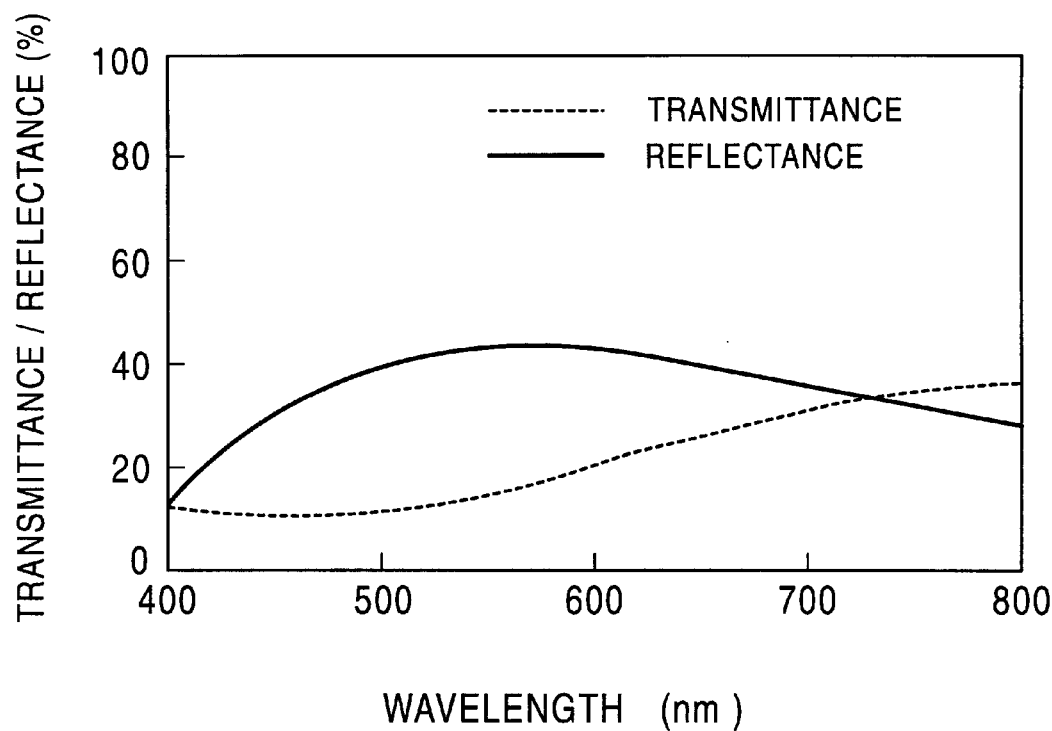
FIG. 4 is a graph which shows the relationships between the central wavelength and the reflectance and between the central wavelength and the transmittance of the optical filter shown in FIG. 1 when light is applied from the side of the substrate.

FIG. 4 is a graph which shows the relationships between the central wavelength λ and the transmittance and between the central wavelength λ and the reflectance of the optical filter having the configuration described above, wherein light is applied in the reverse direction. Clearly, when the incident light enters from the side of the substrate 1, the reflectance reaches 15% or more at a central wavelength λ in the whole range between 700 and 800 nm, and the predetermined properties cannot be obtained.

As a result of the above, it is possible to provide an optical filter which achieves a predetermined transmittance and a very low reflectance at a central wavelength λ of, for example, 780 nm and which has few layers, by depositing the high refractive index film 4, the metal film 3, and the low refractive index film 2 on the substrate 1 in that order in the direction of the incident light A and by using a material, as the metal film 3, which has a refractive index of 1 or more at a predetermined central wavelength λ.

Figure 5:
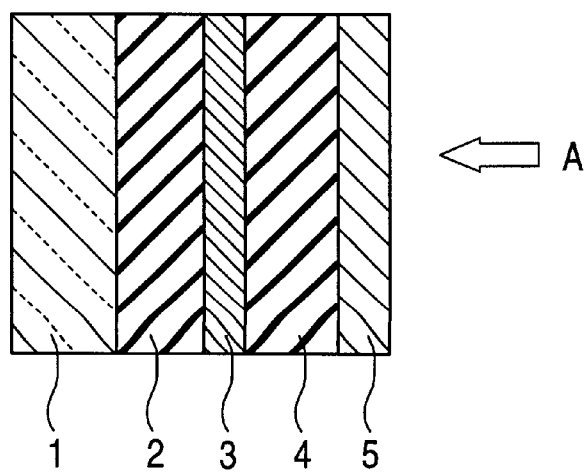
FIG. 5 is a schematic representation of an optical filter as another embodiment of the present invention.
Figure 6A:
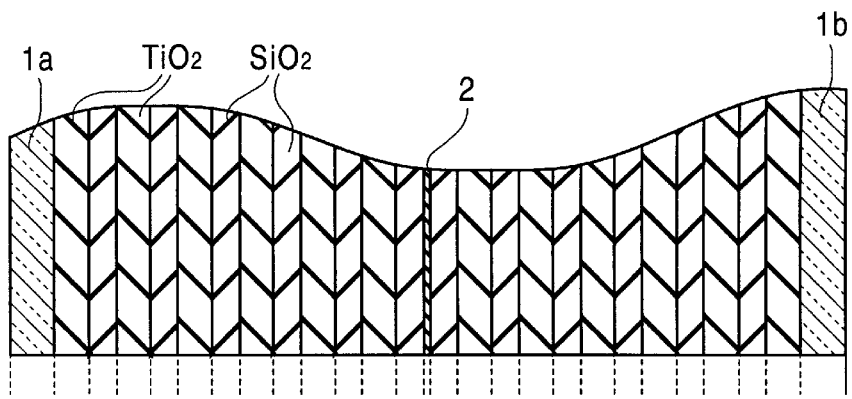
FIG. 6A is a schematic representation showing a multilayered configuration of a conventional optical filter.
Figure 6B:
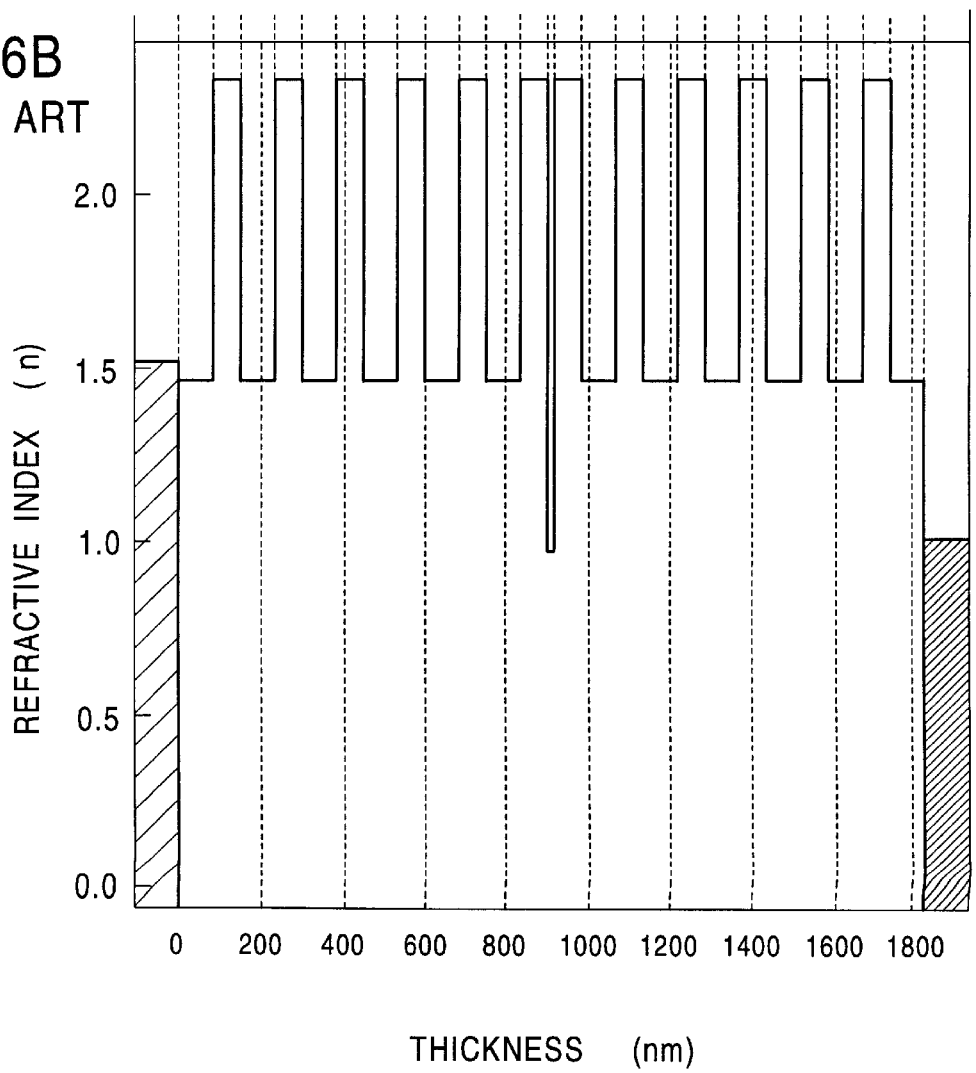
FIG. 6B is a graph showing the thickness and refractive index of each layer of the optical filter shown in FIG. 6A.
Figure 7:
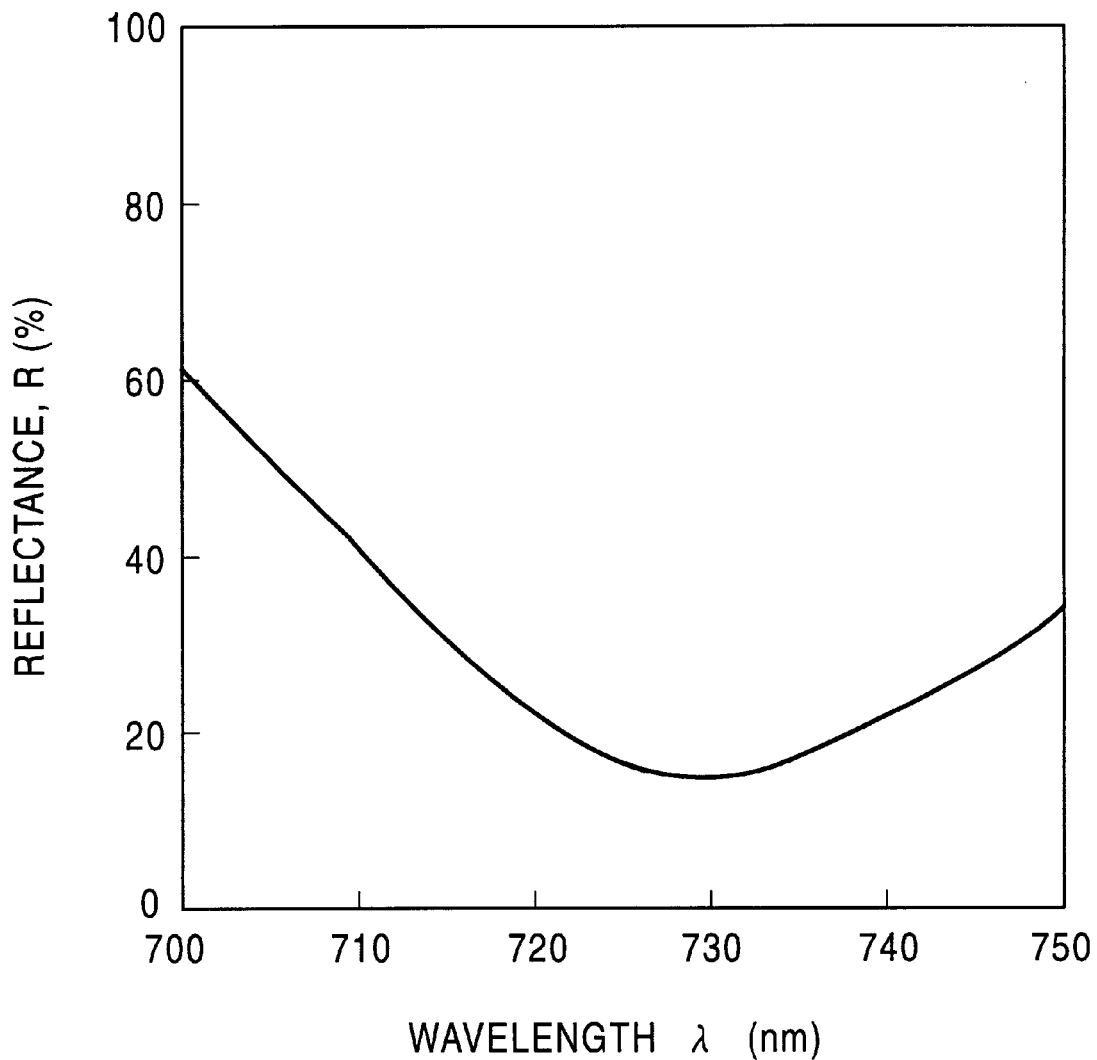
FIG. 7 is a graph which shows the reflectance characteristics of the optical filter shown in FIG. 6A.
Figure 8:
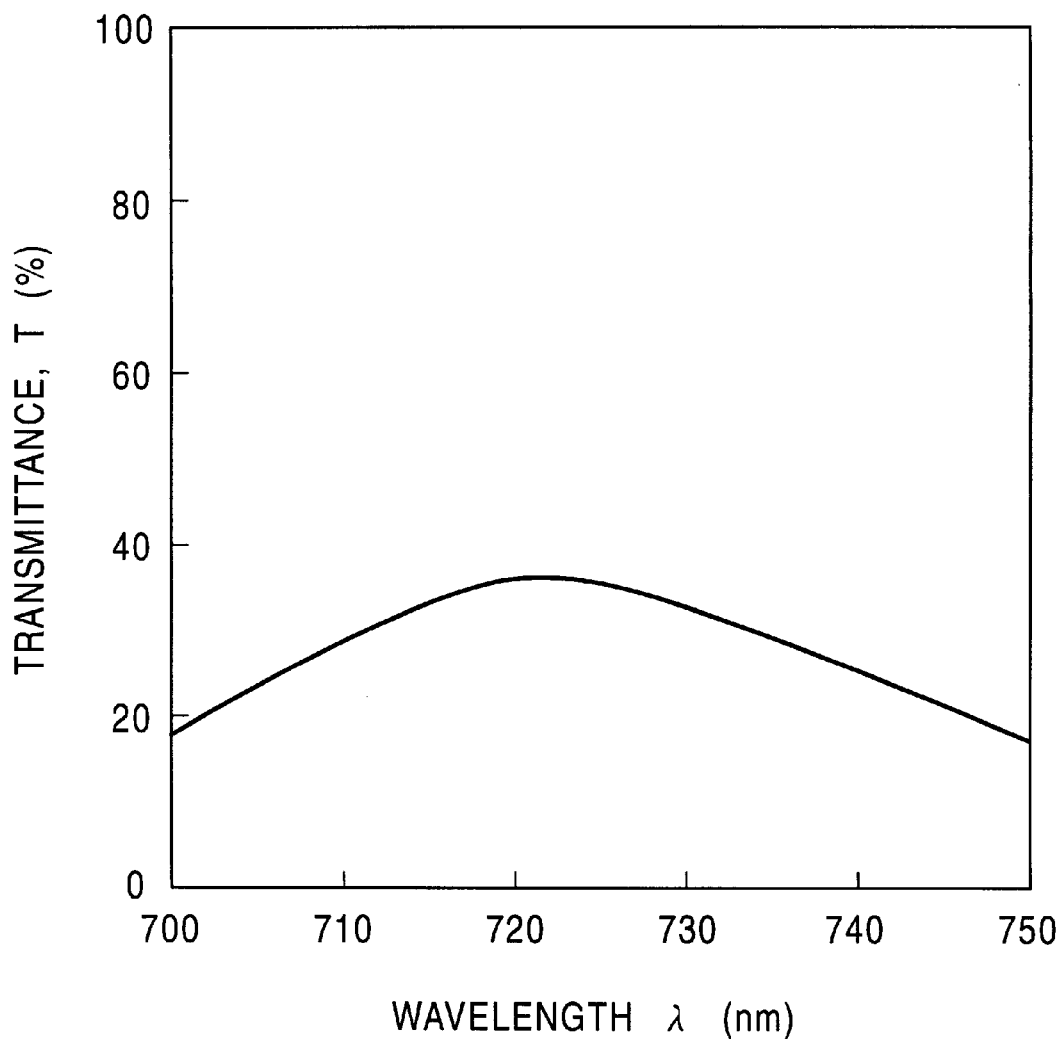
FIG. 8 is a graph which shows the transmittance characteristics of the optical filter shown in FIG. 6A.

In the above-mentioned embodiment of the present invention, a three-layered configuration including a metal film 3 sandwiched between a single-layer low refractive index film 2 and a high refractive index film 4 is described. However, a pair of dielectric blocks enclosing the metal film 3 may be multilayered as long as each of the pair has a different equivalent refractive index. For example, in another embodiment of the present invention shown in FIG. 5, a protective layer 5 is deposited on the surface of a high refractive index film 4, resulting in a four-layered configuration. For a material for the protective layer 5, AlN, diamond like carbon (DLC), or the like, which has excellent wear-resistant properties and high thermal conductivity, is suitable.

Further, an adjusting layer may be deposited on either one or both of the high and low refractive index dielectric blocks in order to adjust the relative equivalent refractive indices of both dielectric blocks. In such a case, the number of layers deposited on the substrate 1 slightly increases, however, in comparison with the conventional multilayered configuration composed of several tens of layers, the number of layers is considerably small.

The present invention has the following advantages.

By using a metal film having a refractive index of 1 or more, sandwiching the metal film between a pair of dielectric blocks having different equivalent refractive indices, and depositing the high refractive index dielectric block, the metal film, and the low refractive index dielectric block on the substrate in that order in the direction of the incident light, a predetermined transmittance as well as a low reflectance are obtainable, and also the fabrication process can be simplified because of the decreased number of layers.

Also, if a single-layer dielectric thin film is selected for the dielectric block having a high refractive index and for the dielectric block having a low refractive index, the fabrication process can be considerably simplified because the optical filter has a three-layered configuration as a whole.

What is claimed is:

1. An optical filter for absorbing a part of optical signals of transmitted light having a central wavelength λ and restricting the intensity of the transmitted light having a central wavelength λ, the optical filter comprising:

a substrate;

a dielectric block having a low equivalent refractive index, the dielectric block having a low equivalent refractive index deposited upon the substrate;

a metal film, the metal film deposited upon the dielectric block having a low equivalent refractive index, the metal film comprising a metal having a refractive index of at least 1 at the central wavelength λ; and a dielectric block having a high equivalent refractive index, the dielectric block having a high equivalent refractive index deposited upon the metal film, wherein the dielectric block of low equivalent refractive index, the metal film, and the dielectric block of high equivalent refractive index are applied in thicknesses which collectively achieve a reflectance of no more than 0.01% and a transmittance of at least 40% over the same range of wavelengths, and wherein the optical filter is oriented such that incident light enters the optical filter only in a direction where the incident light encounters the dielectric block having a high equivalent refractive index before encountering said dielectric block having a low equivalent refractive index.

2. An optical filter according to claim 1, wherein both said dielectric block having a high refractive index and said dielectric block having a low refractive index comprise a single-layer dielectric thin film.

3. An optical filter according to claim 1, wherein a protective layer is provided on the surface of said dielectric block which is not in contact with said substrate.

4. An optical filter according to claim 1, wherein said dielectric block having a high refractive index comprises $TiO_2$ and said dielectric block having a low refractive index comprises $SiO_2$.

5. An optical filter according to claim 1, wherein said metal film comprises one metal selected from the group consisting of Ni, Pt and Ti.

* * * * *